Figure 1:
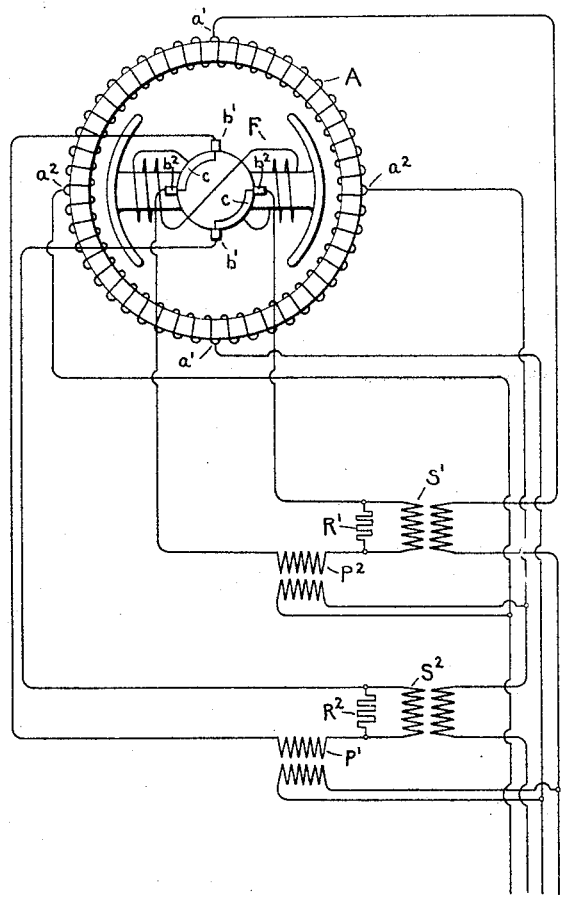

No. 789,476. PATENTED MAY 9, 1905.
E. F. W. ALEXANDERSON.
ALTERNATING CURRENT GENERATOR.
APPLICATION FILED AUG. 19, 1904.

Witnesses:
J. Ellis Glen.
Helen Orford

Inventor,
Ernst F. W. Alexanderson.
By Albert G. Davis
Atty.

No. 789,476. PATENTED MAY 9, 1905.
E. F. W. ALEXANDERSON.
ALTERNATING CURRENT GENERATOR.
APPLICATION FILED AUG. 19, 1904.

2 SHEETS—SHEET 2.

Witnesses:
J. Ellis Glen.
Helen Orford

Inventor,
Ernst F.W. Alexanderson.
By Albert G. Davis
Atty.

No. 789,476. Patented May 9, 1905.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

ALTERNATING-CURRENT GENERATOR.

SPECIFICATION forming part of Letters Patent No. 789,476, dated May 9, 1905.

Application filed August 19, 1904. Serial No. 221,322.

*To all whom it may concern:*

Be it known that I, ERNST F. W. ALEXANDERSON, a subject of the King of Sweden and Norway, residing at Schenectady, county of Schenectady, State of New York, have invented certain new and useful Improvements in Alternating-Current Generators, of which the following is a specification.

My invention relates to self-exciting alternating-current generators of the type in which a portion of the armature-current is rectified and supplied to the field-winding. Numerous machines of this type have been devised heretofore; but in operation such severe sparking was produced at the commutator or rectifier as to render such machines as heretofore designed unsatisfactory for widely-varying loads. I have succeeded, however, in producing a self-exciting alternating generator which automatically compensates for varying loads and power factors and which runs sparklessly under all conditions of operation. I believe that the sparking which has hitherto rendered such machines practically inoperative for varying loads has been due to two causes. In the first place the circuit from which the exciting-current has been derived has heretofore always been an inductive circuit in which the current usually had to pass the secondary of some kind of series transformer if compounding was desired. The secondary of the series transformer in particular acts like a reactance, and the result is that if the exciting-circuit is broken in commutation violent sparking is produced, owing to its self-induction. In the second place the field-winding itself is of course highly self-inductive, and opening its circuit in commutation is consequently attended with violent sparking. I believe that one or both of these causes of sparking have been present in all self-exciting alternating-current generators as heretofore designed, while by my invention I eliminate both causes of sparking, and thereby obtain entire freedom from sparks with widely-varying loads and power factors.

One feature of my invention accordingly consists in rendering the exciting-circuit practically non-inductive. I accomplish this by placing in series with the potential-transformer or other source of constant excitation a non-inductive resistance and connecting the secondary of the series transformer, which compensates for the varying loads and power factors, across a portion or the whole of this non-inductive resistance. By this arrangement two advantageous results are obtained. In the first place the exciting-circuit is made non-inductive, so that it can be broken in commutation with practically no sparking, and in the second place perfect regulation of current in the exciting-circuit relative to that in the main circuit is obtained—that is to say, while in an arrangement in which the secondary of potential and series transformers are connected in series the series transformer tends at all times to overpower the secondary of the potential-transformer, so as to determine at all times the current flowing in the secondary circuit. By means of my invention the secondary of the series transformer acts merely to impress upon the terminals of a non-inductive resistance connected in the exciting-circuit a potential varying in magnitude and phase with the current in the main circuit.

A second feature of my invention consists in so arranging the commutator and its connections that the field-winding is never open-circuited, but is merely transferred from one phase of the exciting-circuit to another at a time when the voltages of the two phases are practically equal. Thus the field-circuit is never open, but its self-induction acts merely to maintain a practically constant current-flow in the field. Furthermore, I so arrange the commutator that a wide insulating-space exists between the active segments, so that in case there is a tendency to spark from any cause, such as improper adjustment of the brushes, flashing over from one segment to another is rendered impossible.

My invention will best be understood by reference to the accompanying drawings, in which—

Figure 2:
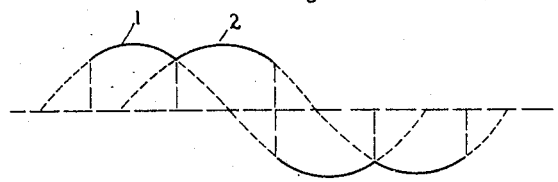
Figure 3:
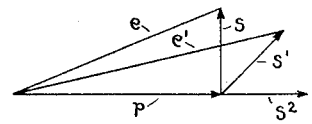
Figure 4:
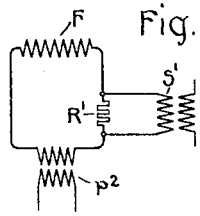
Figure 5:
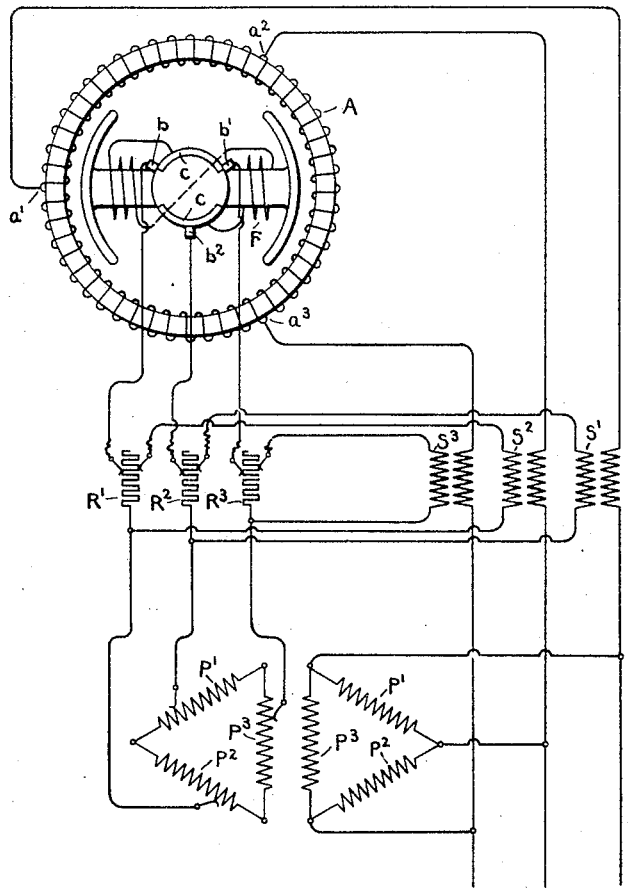
Figure 6:
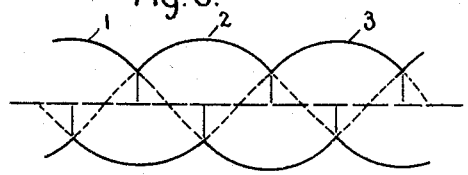
Figure 7:
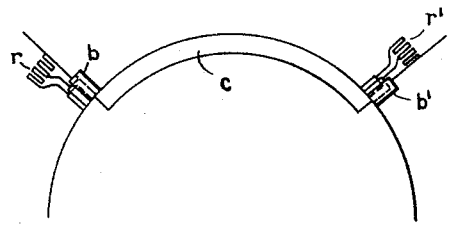

Figure 1 shows diagrammatically a two-phase alternating-current generator provided with compounding transformers and a rectifier arranged in accordance with my invention. Fig. 2 is an explanatory diagram showing the manner in which the current is rectified. Fig. 3 is an explanatory diagram of the compounding for varying power factors. Fig. 4 is a simplified diagram of the connections of the compounding transformers. Fig. 5 shows a three-phase alternator provided with a rectifier and compounding transformers in accordance with my invention. Fig. 6 is a diagram showing a rectified voltage for a three-phase machine; and Fig. 7 shows an arrangement of the brushes which may be sometimes used to avoid sparking.

Referring first to Fig. 1, A represents an armature of an alternating-current generator which for the sake of simplicity I have shown as a Gramme ring. It will be understood, however, that in practice the usual distributed drum-armature winding placed in slots or holes in a laminated armature-body would be employed. The terminals of one phase are indicated by the letters $a'$ $a'$ and of the other phase by the letters $a^2$ $a^2$.

F represents the revolving field structure, which carries a novel form of two-part commutator C. On the commutator bear two pairs of brushes or sets of brushes $b'$ $b'$ and $b^2$ $b^2$. These brushes are displaced from each other by ninety electrical degrees—that is, by an amount equal to the angular displacement of the phases of the armature-winding. The commutator is provided with two conducting-segments $c$ $c$, the length of each of which is approximately equal to the displacement of the brushes—that is, to ninety electrical degrees. The portions of the commutator between the segments are made of insulating material. A source of two-phase current, as will be hereinafter described, is connected to the two pairs of brushes.

It will be seen that as one pair of brushes leaves the two segments the other pair reaches the segments, so that the circuit of the field-winding, which is connected to the two segments, is never opened, but is simply transferred from one phase to the other. This transfer takes place every ninety degrees, and if the brushes are properly placed the resultant potential impressed upon the field-winding F will be as indicated in full lines in Fig. 2. In this figure, 1 represents the potential of one phase, which is connected to the brushes $b'$ $b'$, and 2 represents the potential of the other phase, which is connected to the brushes $b^2$ $b^2$. If the brushes are properly placed, the transfer from one phase to the other may occur at the point of intersection of the two curves, as indicated in the figure. At this point of intersection the two phases are at precisely the same potential, and consequently if the transfer could be made instantaneously at this point absolutely no sparking could be produced. In practice of course it is necessary that both pairs of brushes should be in contact with the same segment for more than an instant, since some contact-surface is required between the brushes and segments to carry the field-current, so that one brush must pass partly or wholly onto a segment before the other brush entirely leaves. During this instant one phase is short-circuited on the other; but I reduce the duration of this short-circuit to its minimum value by making the segments approximately equal in length to the brush displacement, so that one brush begins to leave the segment at the instant the other brush begins to engage it. With this arrangement the duration of the short-circuit may be made so small that in practice no sparking is visible. Furthermore, owing to the exceedingly great distance between segments flashing over on the commutator is impossible.

It will be seen from the drawings that one set of brushes $b'$ $b'$ is connected, through the resistance $R^3$, to the secondary of the potential-transformer P'. The resistance $R^3$ is inserted in the circuit for the purpose that has been heretofore explained—i. e., to render the exciting-circuit non-inductive. The presence of this resistance $R^3$ enables the secondary circuit of the transformer P' to be broken by the brushes $b'$ $b'$ with practically no sparking. In order to compound properly for varying loads and power factors, I have shown a series transformer $S^2$, with its secondary connected across the terminals of resistance $R^3$. Connecting the series transformer in shunt to the resistance in this manner not only leaves the exciting-circuit non-inductive, but also insures proper regulation of the current in the exciting-circuit relative to the current in the main circuit. As has been mentioned heretofore, proper regulation is not obtained where the secondaries of series and potential transformers are connected in series in the closed circuit, as in the ordinary arrangement. The reason for this has been briefly stated, but will appear more clearly from the following. Where the secondary of a series transformer is included in a closed circuit, the current-flow in that closed circuit will be absolutely determined by the current in the circuit of the primary of the series transformer and the ratio of transformation. Thus if a series and potential transformer have their secondaries simply connected in series the series transformer will determine the flow of current in the secondary circuit and the potential-transformer will have no effect. This will be the case unless the potential-transformer is made sufficiently strong to overpower the series transformer—that is, to force sufficient current through it to saturate its core. If this is done, the series transformer is of no effect. The above difficulty may be somewhat obviated by forming a series transformer with an open magnetic circuit, so that its leakage-current is high; but this arrangement produces an inefficient transformer. Moreover, the secondary of the series transformer at all times acts as a reactance in the secondary circuit, thereby rendering it highly inductive, so as to make it impossible to obtain satisfactory commutation. By connecting the series transformer in shunt to the non-inductive resistance, however, the above difficulty is wholly removed, while at the same time standard and efficient transformers may be employed. With this arrangement the secondary circuit of the potential-transformer is closed through a non-inductive resistance and the field, while the secondary of the series transformer is closed through the resistance. The variation in current in the primary winding of a series transformer produces a variation of current in the shunt resistance. This variation of current through the resistance produces a variation of potential at the terminals of the resistance. In other words, the series transformer acts simply to impress upon the field-circuit a potential in series with that of the potential-transformer and varying with the current in the circuit.

It will be seen from Fig. 1 that the primary of potential-transformer P' is connected in one phase, while the primary of the series transformer $S^2$ is connected in the second phase. For a non-inductive load, therefore, when the current in each phase is in phase with its potential the secondary voltages of the two transformers will be ninety degrees out of phase. This is indicated in Fig. 3, in which the line $p$ indicates the magnitude and phase of the secondry voltage obtained from the potential-transformer. The line $s$ represents the magnitude and phase of the potential obtained from the secondary of the series transformer for a non-inductive load of a given amount. The vector sum of these two lines, which is represented by $e$, represents the value of the potential impressed upon the brushes $b'$ $b'$. Now assume that the load remains constant in amount, but varies in phase so as to lag forty-five degrees. The secondary voltage of the series transformer will be represented by the line $s'$, and the resultant electromotive force impressed upon the brushes will be represented by the line $e'$. It will be seen that this line is greater than the line $e$. Thus the electromotive force impressed upon the brushes is increased as the power factor decreases. With a power factor of zero the secondary of the series transformer will be represented by the line $s^2$, and the potential impressed upon the brushes would be the algebraic sum of the lines $p$ and $s^2$. From this it will be seen that by properly proportioning the potential and series transformers the voltage impressed upon the field-winding may be properly varied to compensate for varying power factors. Similarly, it is evident that if the line $s$ or $s'$ in Fig. 3 be increased or decreased the length of line $e$ or $e'$ will be also increased or decreased. Thus this arrangement automatically compounds for varying load as well as for varying power factor.

The potential-transformers $P^2$ and $S'$ form a similar arrangement for the second pair of brushes $b^2$ $b^2$, so that a two-phase excitation is impressed upon the two sets of brushes, so as to give an impressed electromotive force on the field, as shown in Fig. 2. It should be understood that Fig. 2 represents the potential impressed upon the field and not the current. Since the self-induction of the field-circuit is very great, there is a tendency to smooth out even the small fluctuations in impressed voltage shown in Fig. 2, so that the current curve would be represented by a nearly straight line.

Fig. 5 shows a similar arrangement adapted to a three-phase alternator. Three brushes are employed, which are displaced one hundred and twenty electrical degrees, and each contact-segment is approximately one hundred and twenty electrical degrees in length, or, in other words, its length is equal to the angular displacement between the several phases of the armature. Three series transformers $S'$, $S^2$, and $S^3$ are employed in the three phases of the armature-circuit, and three potential-transformers $P'$ $P^2$ $P^3$ are shown connected in delta. The secondaries of the potential-transformers are also connected in delta. I have shown means for varying the phase of the voltage derived from the secondary delta, so that the desired difference of phase between the voltage taken from any phase of the delta and the voltage impressed upon the resistance in series therewith by the series transformer may be readily adjusted to its proper value. Furthermore, I have shown the resistance shunting the series transformer variable in amount. By this means the relative values of the voltages from the potential and series transformers may be adjusted. I have also shown the amount of resistance in series with the field as variable. By this means the field strength may be varied manually, as is commonly done with alternators as ordinarily constructed. The resistances $R'$, $R^2$, and $R^3$ take the place of the usual field-rheostat employed with a generator.

The action of the commutator is shown in Fig. 6, the point at which the transfer is made from one phase to the other being the point of intersection of the curves, as was the case in the two-phase arrangement.

So far the question of the shifting of the point of intersection of two waves of different phases has not been considered. By referring to Fig. 3, however, it will be seen that a change either in the magnitude or in the phase of the current in the armature-circuit—that is, a variation in the length or position of the line $s$—will produce a change not only in the length but also in the position of the line $e$ relative to the line $p$. The line $p$, which represents in phase as well as in magnitude the voltage of the armature-circuit, is fixed with reference to the position of the field structure in space if the effect of armature reaction be for the moment neglected, which means that it is fixed with respect to the position in space of the commutator-segments $c$ $c$. In other words, the variations in the magnitude and phase of the armature-current shift the potentials impressed upon the commutator-brushes with respect to the point of commutation. Consequently commutation no longer occurs after such a change at the point of intersection of the two current waves, and this change is productive of a tendency to spark. I have found that the effect of armature reaction, which shifts the field flux relative to the field structure, is to counterbalance somewhat this shifting tendency, so that in a machine properly designed and with the correct relative proportions of the potential and series transformers the shifting of the point of commutation with respect to the impressed voltage is too small to produce sparking of any consequence. In case the various parts are not properly proportioned, however, and more or less sparking occurs with change of the load the arrangement shown in Fig. 7 may be utilized to reduce the sparking to a negligible amount. In the arrangement shown in Fig. 7 each brush $b$ is composed of a plurality of brushes displaced by a small amount around the commutator. The several brushes are connected by a resistance $r$. This form of brush and its principle of operation are well known and need no explanation.

For the sake of simplicity I have shown my invention as applied to a bipolar machine. It will be understood, however, that it is applicable to a machine with any number of poles. The commutator-segments in each case will be equal in number to the number of poles, and the length of the commutator-segments will always be approximately equal to the angular displacement between the several phases, it being understood that this length is measured in electrical and not in physical degrees.

Although I have shown the constant excitation derived indirectly from the armature-winding through potential-transformers, it will be understood that any other suitable source of constant potential, such as winding of the machine itself, may be utilized in place of the potential-transformers.

I do not desire to limit myself to the particular construction and arrangement of parts shown; but I aim in the appended claims to cover all modifications which are within the scope of my invention.

What I claim as new, and desire to secure by Letters Patent of the United States, is—

1. In combination with a polyphase alternating-current generator having a field-winding provided with a commutator, a source of polyphase potential connected to said commutator, non-inductive resistances connected in series with said source, and series transformers having their primaries connected in series with the several phases of the armature and having their secondaries connected in shunt to said resistances.

2. In combination with a polyphase alternating-current generator having a field-winding provided with a commutator, a source of polyphase potential connected to said commutator, non-inductive resistances connected in series with said source, and series transformers having their primaries connected in series with the several phases of the armature and having their secondaries connected in shunt to said resistances, said transformers being connected to produce when the load on the generator is non-inductive a potential at the terminals of the shunting resistance substantially ninety degrees out of phase with the potential of that phase of said polyphase source in series with which said resistance is connected.

3. In combination with a polyphase alternating-current generator having a field-winding provided with a commutator, potential-transformers and series transformers energized from the armature-circuit and having their secondaries connected to said commutator, and non-inductive resistances connected in series with the potential-transformers and in shunt to the series transformers.

4. In combination with a polyphase alternating-current generator having a field-winding provided with a commutator, a source of polyphase potential connected to said commutator, resistances connected in series with the several phases of said source, and series transformers each having its secondary connected in shunt to one of said resistances and having its primary connected in the armature-circuit to produce, when the load on the generator is non-inductive, a secondary voltage at an angle of approximately ninety degrees to the voltage of that phase of the polyphase source in series with which said resistance is connected.

5. In combination with a polyphase alternating-current generator having a field-winding provided with a commutator, a source of polyphase potential connected to said commutator, resistances connected in series with the several phases of said source, series transformers each having its secondary connected in shunt to one of said resistances and having its primary connected in the armature-circuit to produce, when the load on the generator is non-inductive, a secondary voltage at an angle of approximately ninety degrees to the voltage of that phase of the polyphase source in series with which said resistance is connected, and means for varying the magnitude of said angle.

6. In combination with a polyphase alternating-current generator having a field-winding provided with a commutator, a source of polyphase potential connected to said commutator, non-inductive resistances connected in series with said source, series transformers having their primaries connected in series with the several phases of the armature and having their secondaries connected in shunt to said resistances, and means for varying the amount of said resistances.

7. In combination with a polyphase alternating-current generator having a field-winding provided with a commutator, means for impressing on said commutator a polyphase constant voltage derived from the armature, resistances in series with the several phases of said voltage, and series transformers each having its primary connected in series with one phase of the armature and its secondary in shunt to one of said resistances.

8. In combination with a polyphase alternating-current generator having a field-winding provided with a commutator, means for impressing on said commutator a polyphase constant voltage derived from the armature, resistances in series with the several phases of said voltage, series transformers each having its primary connected in series with one phase of the armature and its secondary in shunt to one of said resistances, and means for varying the amount of said resistances.

9. In an alternating-current generator, a revolving field-magnet, a commutator carried thereby having two segments per pair of poles, brushes bearing on said commutator, and means for impressing polyphase voltages on said brushes, the length of each commutator-segment being approximately equal to the angular displacement between the phases of said voltages.

10. In an alternating-current generator, a polyphase armature-winding, a revolving field-magnet, a commutator carried by said magnet having two segments per pair of poles, the length of each segment being approximately equal to the angular displacement of the phases of the armature, symmetrically-disposed brushes bearing on said commutator and corresponding in number to the phases of the armature, and means for impressing on said brushes a polyphase excitation derived from the armature.

11. In an alternating-current generator, a revolving field-magnet, a commutator carried thereby having two segments per pair of poles, and means for impressing a polyphase excitation on said commutator, the length of the segments of said commutator being approximately equal to the angular displacement between the phases of said excitation.

12. In an alternating-current generator, a revolving field-magnet, a source of polyphase excitation therefor, a commutator carried by said field-magnet having two segments per pair of poles, the length of each segment being approximately equal to the angular displacement between the phases of said excitation, and symmetrically-displaced brushes bearing on said commutator and connected to said source of excitation.

13. In an alternating-current generator, a polyphase armature-winding, a revolving field-magnet, a commutator carried by said magnet having two segments per pair of poles, the length of each segment being approximately equal to the angular displacement of the phases of the armature, symmetrically-disposed brushes bearing on said commutator and corresponding in number to the phases of the armature, means for impressing on said brushes a polyphase excitation derived from the armature, and means for varying the voltage impressed on said brushes when the magnitude or phase of the armature-current varies.

14. In an alternating-current generator, a revolving field-magnet, a commutator carried thereby having two segments per pair of poles, brushes bearing on said commutator, means for impressing polyphase voltages on said brushes, the length of each commutator-segment being approximately equal to the angular displacement between the phases of said voltages, and means for varying said voltages when the load on the generator varies in magnitude or in phase.

In witness whereof I have hereunto set my hand this 18th day of August, 1904.

ERNST F. W. ALEXANDERSON.

Witnesses:
BENJAMIN B. HULL,
HELEN ORFORD.